(12) United States Patent
Liu et al.

(10) Patent No.: US 11,858,223 B2
(45) Date of Patent: Jan. 2, 2024

(54) BOND STRIP TECHNOLOGY

(71) Applicant: Magna Exteriors Inc., Concord (CA)

(72) Inventors: Victor Liu, Markham (CA); Lawrence Vanin, Orangeville (CA); Michael Zorn, Woodbridge (CA)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 17/592,950

(22) Filed: Feb. 4, 2022

(65) Prior Publication Data

US 2022/0242056 A1 Aug. 4, 2022

Related U.S. Application Data

(60) Provisional application No. 63/145,600, filed on Feb. 4, 2021.

(51) Int. Cl.
*B29C 65/00* (2006.01)
*B29C 35/08* (2006.01)

(52) U.S. Cl.
CPC .... *B29C 66/73921* (2013.01); *B29C 35/0805* (2013.01); *B29C 66/1122* (2013.01); *B29C 66/71* (2013.01); *B29C 66/7212* (2013.01); *B29C 2035/0822* (2013.01)

(58) Field of Classification Search
CPC .......... B29C 66/73921; B29C 66/1122; B29C 66/71; B29C 66/7212; B29C 66/1312; B29C 35/0805; B29C 2035/0822; B29C 65/1432
See application file for complete search history.

(56) References Cited

U.S. PATENT DOCUMENTS

| | | | |
|---|---|---|---|
| 5,151,149 A * | 9/1992 | Swartz | B29C 66/1122 156/499 |
| 9,950,471 B2 | 4/2018 | Grgac et al. | |
| 2014/0079908 A1 * | 3/2014 | Kato | B29C 65/02 428/140 |

FOREIGN PATENT DOCUMENTS

WO WO-2020205192 A1 * 10/2020 ............. B29C 45/14

* cited by examiner

*Primary Examiner* — Daniel McNally
(74) *Attorney, Agent, or Firm* — Warn Partners, P.C.

(57) ABSTRACT

A process for joining polymer molded parts. Providing a first part made from a first material and a second part made from a same or different first material. Attaching an infrared or other thermal bonding material to at least one of the parts in a place for the parts to be joined. Thereafter, heating the at least on infrared bonding material with an infrared heating element and pressing the first part into contact with the second part wherein a bond is formed.

13 Claims, 4 Drawing Sheets

FIG. 3
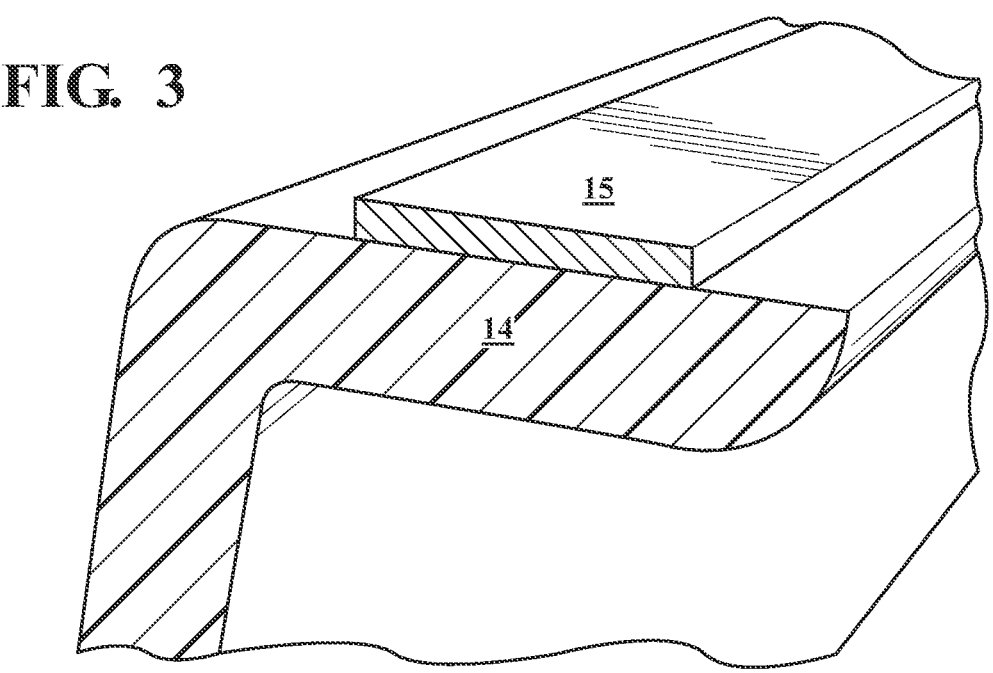
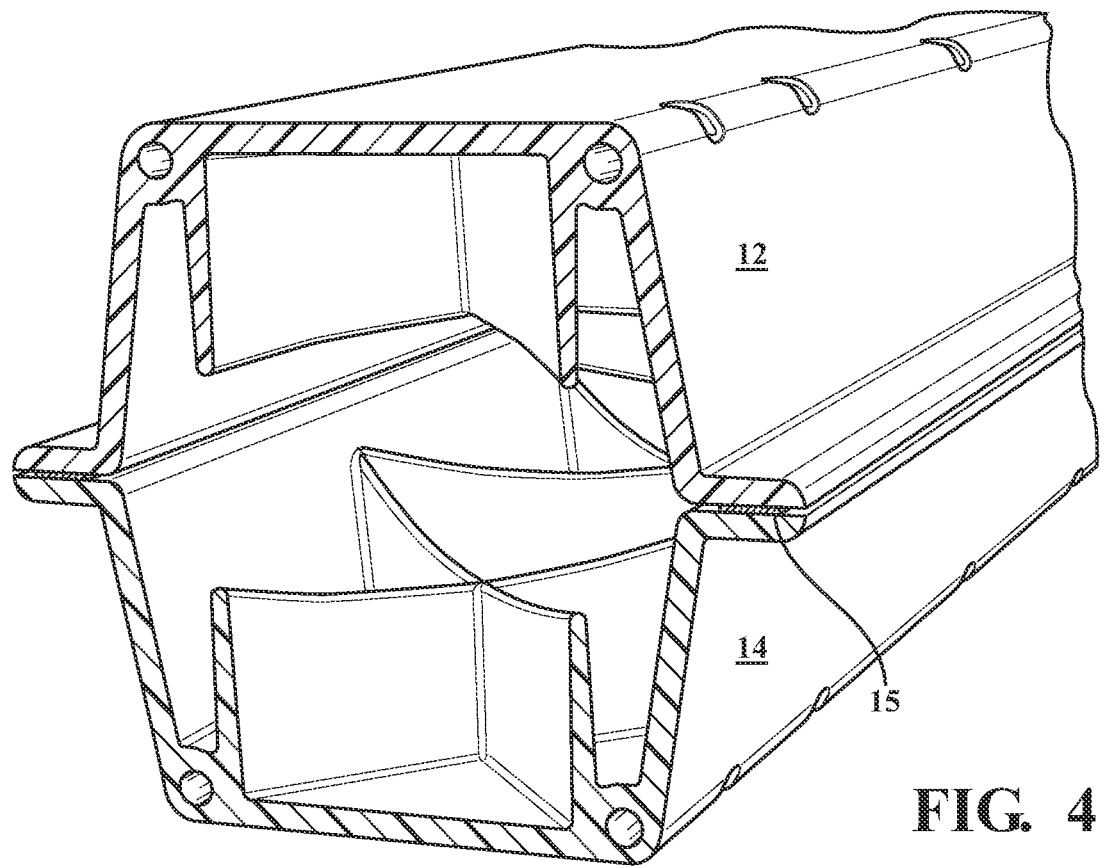
FIG. 4

BOND STRIP TECHNOLOGY

CROSS-REFERENCE TO RELATED APPLICATIONS

This application claims the benefit of U.S. Provisional Patent Application Ser. No. 63/145,600, filed Feb. 4, 2021. The disclosure of the above application is incorporated herein by reference.

FIELD OF THE INVENTION

The present invention relates to joining of fiber filled thermoplastic parts.

BACKGROUND OF THE INVENTION

Resistive implant welding (RIW) process to bond together thermoplastic parts molded with a 20% carbon fiber filled nylon resin have been used in the past and present.

The process consists of molding the two separate components of a part and joining them by way of a special mesh that is heated and rolled with force into one of the components. The two components are then nested together and the mesh in between the two components is energized with electricity, which melts a layer of resin on both sides of the mesh, while the combined parts are pressed together in a press, bonding the two components together to make a strong, single part. Such a process is shown in our co-assigned U.S. Pat. No. 9,950,471.

This process is in manufacturing use today for low volume manufacturing programs of approximately 5000 parts a year. Due to the time-consuming nature of rolling the mesh on to the part and the heating up and pressing of the components together along with the precise control needed for the electrical current being put into the mesh, this process is not suitable to be scaled up for a high volume of parts production.

Therefore, it is a goal in the art to provide an improved process suitable for production part capability.

SUMMARY OF THE INVENTION

The process of the present invention includes a process for joining polymer molded parts. The process includes:
a. Providing a first part made from a first material and a second part made from a same or different material;
b. Attaching an infrared bonding material to at least one of the parts in a place for the parts to be joined; and,
c. Heating the at least on infrared bonding material with an infrared heating element and pressing the first part into contact with the second part wherein a bond is formed.

In order to overcome the problem of bonding both the 20% carbon fiber filled and 60% glass filled resins, we conceived the idea to overmold a strip of secondary resin molded locally on the part, where the IR welded bond is needed to take place. This secondary resin strip would typically be made of same base resin as the structural resin used, but without fillers to disrupt the IR welding process. In the case of our nylon filled resins, we would use a nylon resin with no glass or carbon fiber fillers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a sectional view of area 3 showing the part of FIG. 2;

FIG. 4 is a sectional view showing the parts of FIG. 1 and FIG. 2 joined together by the process of the present invention;

DETAILED DESCRIPTION OF THE PREFERRED EMBODIMENTS

The following description of the preferred embodiment(s) is merely exemplary in nature and is in no way intended to limit the invention, its application, or uses.

In order to overcome the problem of bonding both the 20% carbon fiber filled and 60% glass filled resins, we conceived the idea to overmold a strip of secondary resin molded locally on the part, where the IR welded bond is needed to take place. This secondary resin strip is typically be made of the same base resin as the structural resin used, but without fillers to disrupt the IR welding process. In the case of our nylon filled resins, we would use a nylon resin with no glass or carbon fiber fillers.

These strips of secondary resin could be applied to one or both halves of the components being joined. The width and thickness of the strip would vary depending on the bond needed and the resins effectiveness to be joined.

Other methods of joining besides IR welding may be applicable to using this secondary strip of resin to enable bonding such as hot plate welding, ultrasonic welding or vibration welding.

In an alternate embodiment, the process is also used to allow dissimilar plastics to be joined together. The secondary strips made of compatible resins are added to one or both dissimilar plastics to enable their joining.

In an additional embodiment, this method could be used with adhesives if the base resin in a part is unable to be dissolved by an adhesive to create a sufficient bond to another part. A secondary strip of resin can also be added to make a joint between them compatible if necessary.

The process of adding this secondary strip of material to a primary plastic part is typically done through the process of two-shot injection molding or insert molding. The two-shot injection molding process enables the overmolding of the secondary strip resin because it is done immediately after the primary part resin is injected into the mold. While the primary part is still hot but sufficiently solid to manipulate, it can be presented to another cavity and injected with the secondary plastic resin, forming the strip of material to be bonded. Because this secondary injection of plastic occurs while the primary part is still very hot and is being done with plastics that have common base resin, a strong molecular bond occurs between the two resins. Once this occurs, the two parts can be bonded together by the joining process required.

Figure 1:
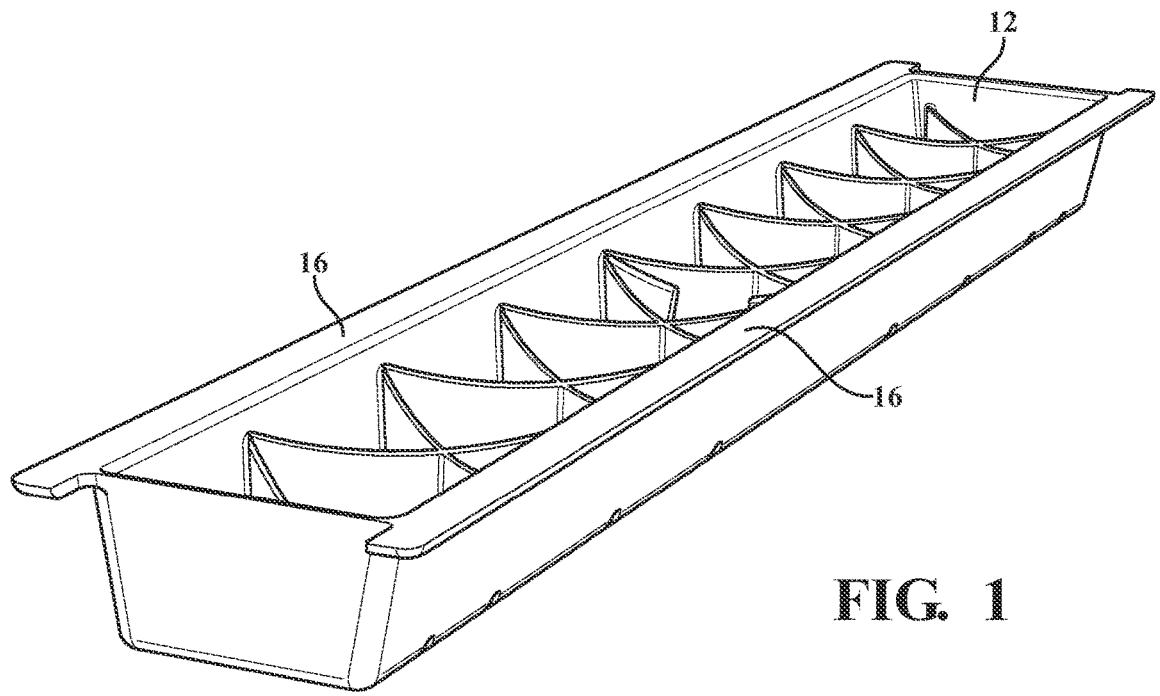
FIG. 1 is a perspective view of a half section of a first molded part to be joined in accordance with the present invention.
Figure 2:
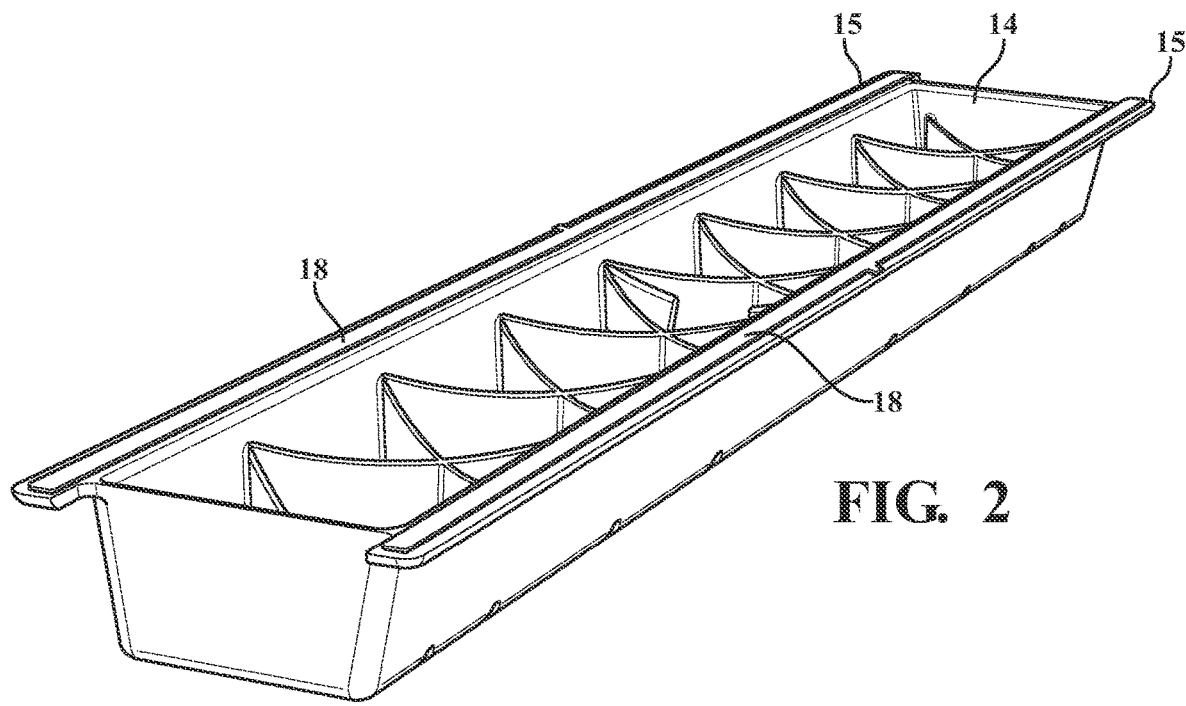
FIG. 2 is a perspective view of a second part to be joined to the first part having a compatible IR bonding material overmolded at the joining locations.
Figure 5:
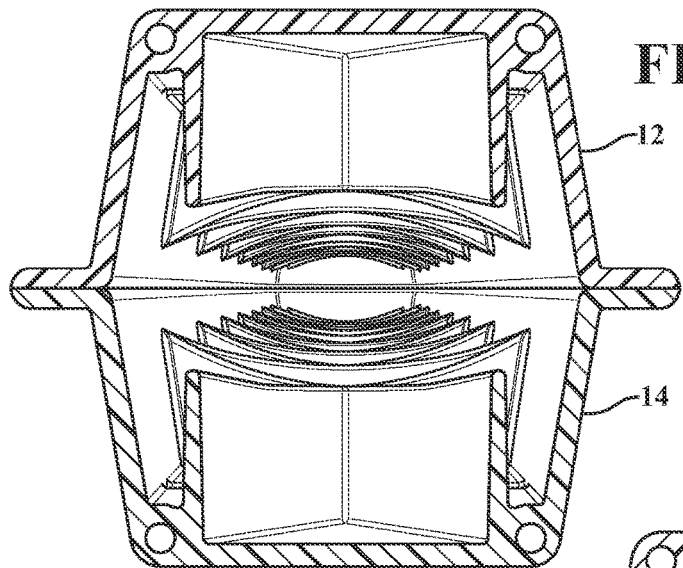
FIG. 5 is a sectional view of a part bonded without any secondary strips.
Figure 6:
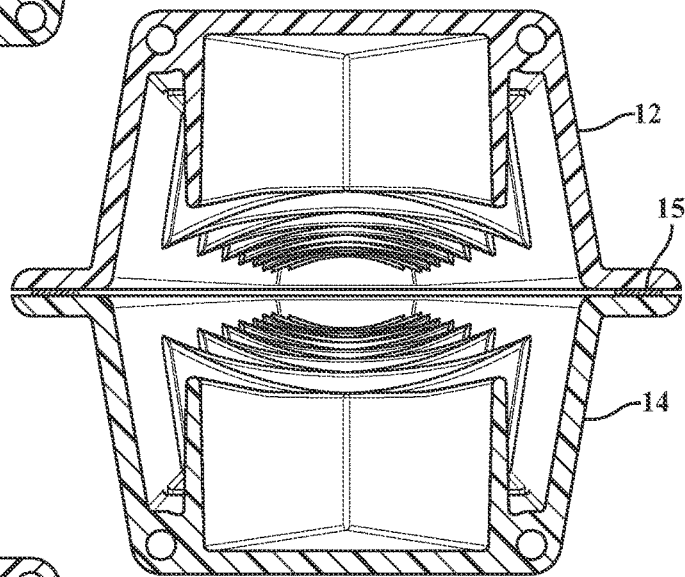
FIG. 6 is a sectional view of a part prior to bonding with overmolded material.
Figure 7:
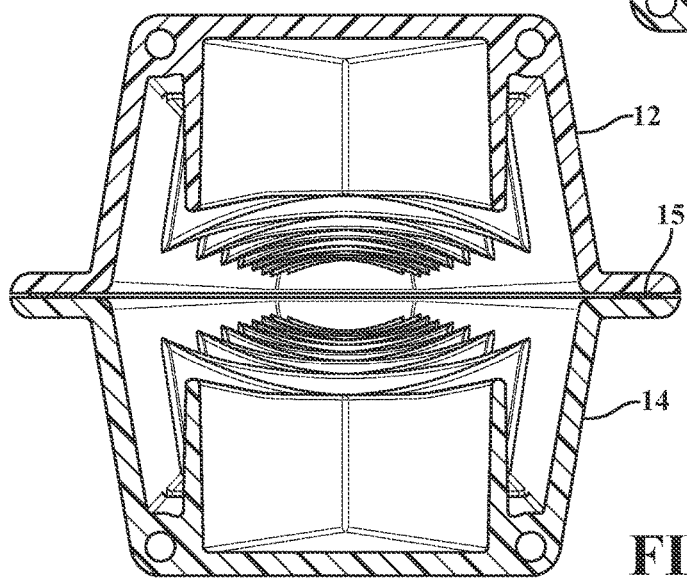
FIG. 7 is a sectional view of the part of FIG. 6 bonded together.
Figure 8:
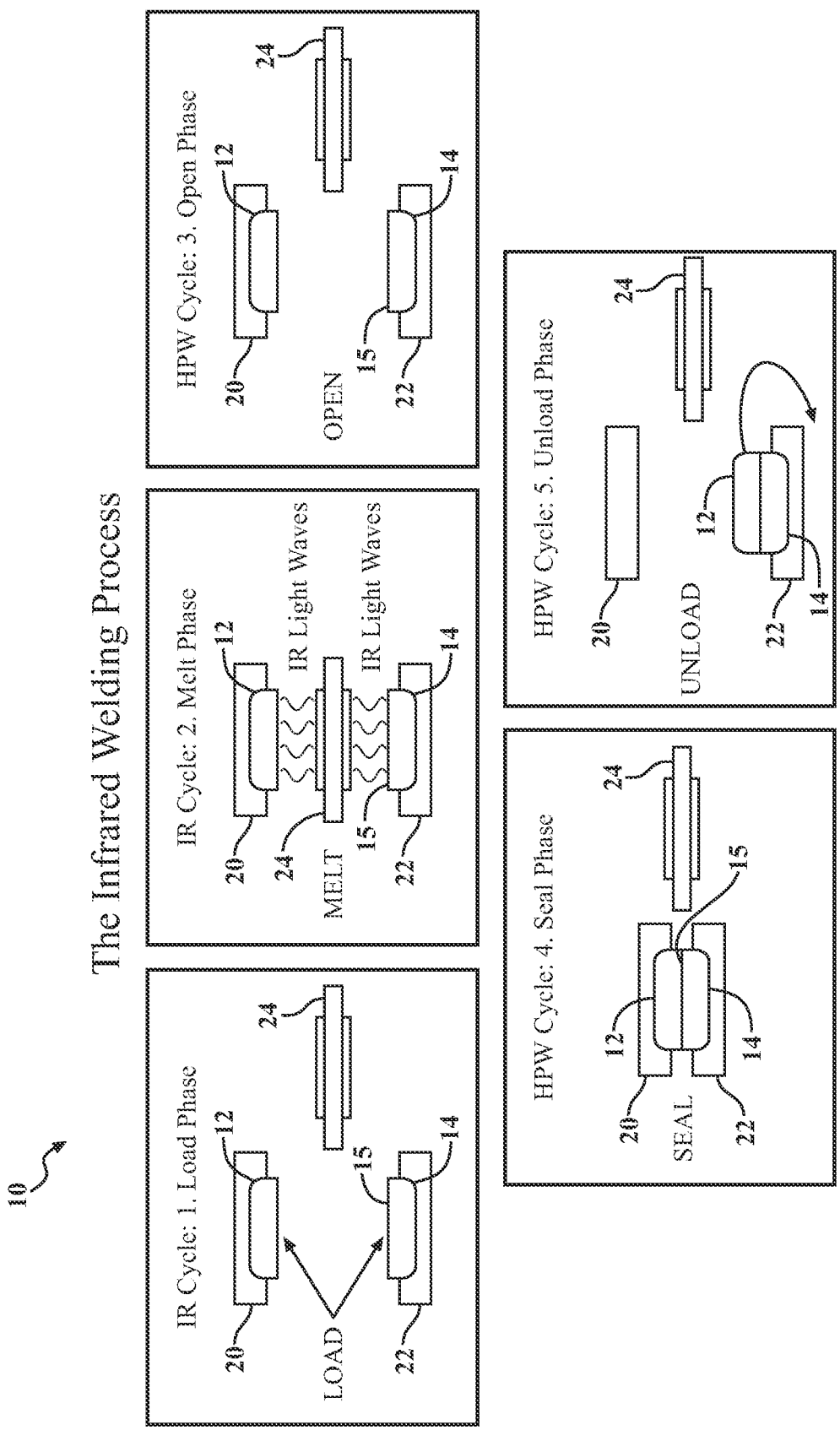
FIG. 8 is a schematic view of the process of the present invention.

Referring now to the drawings, and in particular to FIG. 8, there is provided a process for joining polymer molded parts, generally shown at 10. The process involves the steps of providing a first part 12 and a second part 14 to be joined along cooperative joining portions 16 and 18. The first part made from a first material and a second part made from a same or different material as the first material. Then an infrared bonding material is overmolded or otherwise bonded to at least one of the parts (12, 14) in a place (16 or 18 or both) for the parts 12, 14 to be joined. The parts 12 and 14 are either already in the mold halves 20, 22 that they were molded in, or they are placed in a mold cavity for joining them together. The molds are separated and an infrared heating element 24 is inserted between the parts 12 and 14. This heats at least the surface with the infrared bonding material 15, which can be on one side or both sides. Thereafter the mold is used for pressing the first part 12 into contact with the second part 14 at the joining surface 15 wherein a bond is formed.

When two bonding materials are used the first infrared bonding material and second infrared bonding material are compatible for infrared melt bonding to each other and also to the respective surfaces 16 and 18 on the parts 12 and 14. Preferably parts 12 and 14 comprise thermoplastic fiber filled thermoplastic resins.

While Nylon and glass filled, or graphite filled polypylene are preferred polymers. However, the present process is used with any filled resin with a high filler content that makes joining difficult. Generally, this process would be used with fiber filled materials having above about 20% fillers. Typically, the amount of fillers are about 40% and above fiber content, preferably the filler content is from about 40% to about 60% all fiber fillers are by weight. For carbon fiber filled resins it would be useful for amounts of 20% and above filler. This process when other fillers are present in a resin that makes joining difficult. The present process is also useful to bond two parts with differing levels of filler together, if one half needed some special properties or as a cost saving measure.

As an example, the polymer is a 10-30% carbon fiber filled nylon composition and a nylon material is overmolded on the surfaces to be joined prior to infrared heat treatment for joining the parts. Highly filled 30-60% filled long glass fiber compositions are also joinable using the process of the present invention. Typically, the resin is a carbon fiber or glass filled fiber composition.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A process for joining polymer molded parts comprising:
   a. providing a first part made from a first fiber reinforced thermoplastic material and a second part made from a same or different second fiber reinforced thermoplastic material;
   b. overmolding a layer of an unfilled nylon thermal bonding material to at least one of the parts in a place for the parts to be joined; and,
   c. bonding the first part and the second part directly together with the layer of unfilled nylon thermal bonding material with a thermal bonding process and pressing the first part into contact with the second part wherein a bond is formed.

2. The process of claim 1 wherein the layer of unfilled nylon thermal bonding material is an infrared heated thermal bonding material and the thermal bonding process is an infrared heating process.

3. The process for joining polymer molded parts of claim 2 wherein a second infrared heated thermal bonding material is provided in a corresponding bonding area on said second part.

4. The process for joining polymer molded parts of claim 3 wherein the layer of infrared heated thermal bonding material is compatible for bonding to said first fiber reinforced material and said second layer of said second infrared thermal bonding material is compatible for bonding to said second fiber reinforced material.

5. The process for joining polymer molded parts of claim 4 wherein the layer of fiber reinforced material is the same or different as the second fiber reinforced material and the fiber reinforcing material is a carbon fiber or glass fiber.

6. The process for joining polymer molded parts of claim 2 wherein the layer of unfilled nylon thermal bonding material is overmolded onto said first part at a joining area and a second layer of a second infrared heated thermal bonding material is overmolded onto the second part at a joining area and said layer and said second layer are compatible for infrared melt bonding to each other.

7. The process for joining polymer molded parts of claim 1 wherein the first fiber reinforced material and second fiber reinforced material is a 10-30% carbon fiber filled nylon composition and a nylon material is overmolded on the surfaces to be joined prior to infrared heat treatment.

8. The process of claim 1 wherein the parts are joined by subjecting the layer of unfilled nylon thermal bonding material to a process selected from the group consisting of hot plate welding, ultrasonic welding, vibration welding and combinations of these.

9. A process for joining polymer molded parts comprising:
   a. providing a first part made from a first filled material and a second part made from a second filled material;
   b. overmolding a layer of an unfilled nylon infrared bonding material which is compatible for melt bonding the first material to the second material to at least one of the parts in an injection molding machine for producing for forming the parts to be joined using a two-shot method; and,
   c. heating the unfilled nylon infrared bonding material with an infrared heating element and directly bonding the first part to the second part by pressing the first part into contact with the second part for contacting the parts at an interface where the overmolded layer was deposited wherein a bond is formed directly between the parts at the area of the layer.

10. The process of claim 9 further comprising overmolding a layer of a second unfilled infrared bonding material to the second filled material of the other of the two parts, wherein the first filled material and the second filled material are made of a same base material but having dissimilar levels of fillers and the unfilled bonding material is the same material as a base material of the first filled material and the second material and said second unfilled material is deposited on the second part such that a layer of an unfilled infrared bonding material is attached to each of the first and second parts at respective first and second joining surfaces prior to infrared bonding of the first part to the second part at the joining surfaces.

11. The process of claim 10 wherein the first unfilled nylon infrared bonding material is compatible with bonding to the first filled material and the second unfilled infrared bonding material is compatible with bonding to the second filled material of the second part and wherein the first unfilled infrared bonding material and the second unfilled infrared bonding materials are compatible for bonding to each other.

12. The process of claim 9 wherein the first filled material and the second filled material are the same but having dissimilar levels of fillers and the unfilled nylon bonding material is the same material as a base material of the first filled material and compatible for bonding with the second filled material.

13. The process of claim 9 wherein the first filled material and the second filled material are the same but having dissimilar levels of fillers and the unfilled nylon thermal bonding material is a melt bonding nylon which is different from the first filled material and the second filled material but is compatible for melt bonding one to the other.

* * * * *